Feb. 9, 1971 QUONG NON TSE 3,561,806
VEHICLE SAFETY SYSTEM
Filed Sept. 19, 1968
2 Sheets-Sheet 1
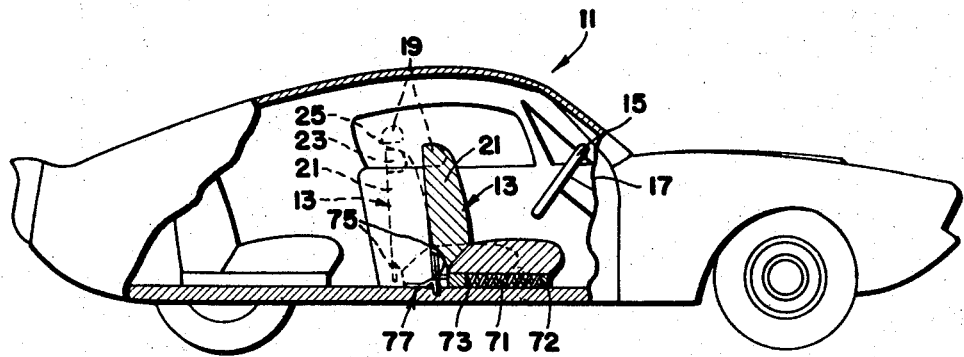
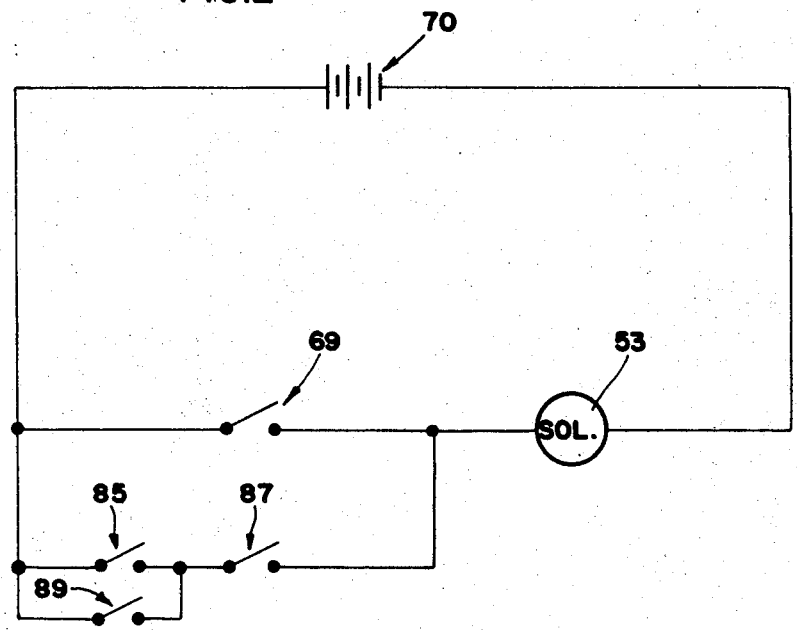
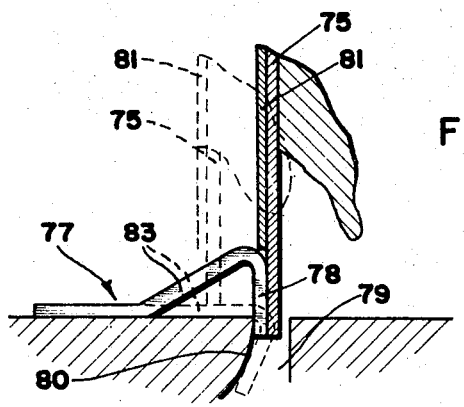
INVENTOR
QUONG NON TSE
Andersson, Luedeka, Fitch, Even & Tabin
ATTYS.

Feb. 9, 1971   QUONG NON TSE   3,561,806
VEHICLE SAFETY SYSTEM
Filed Sept. 19, 1968   2 Sheets-Sheet 2
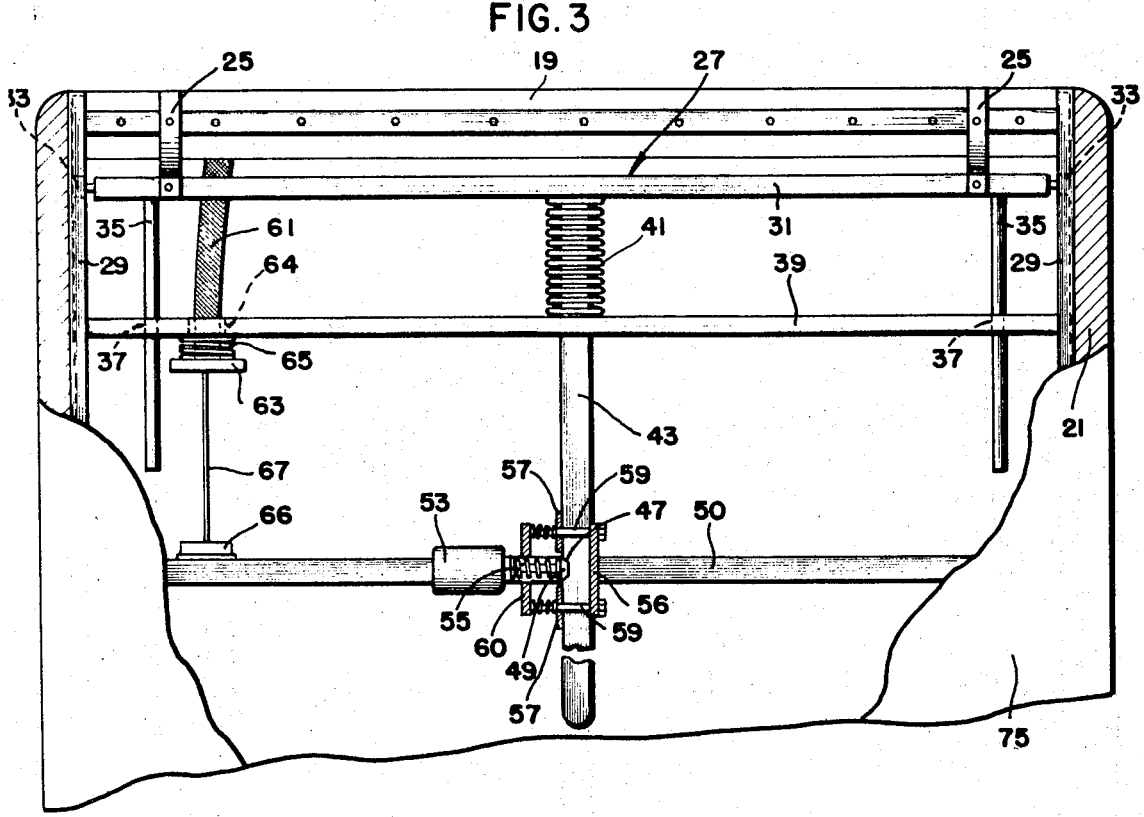
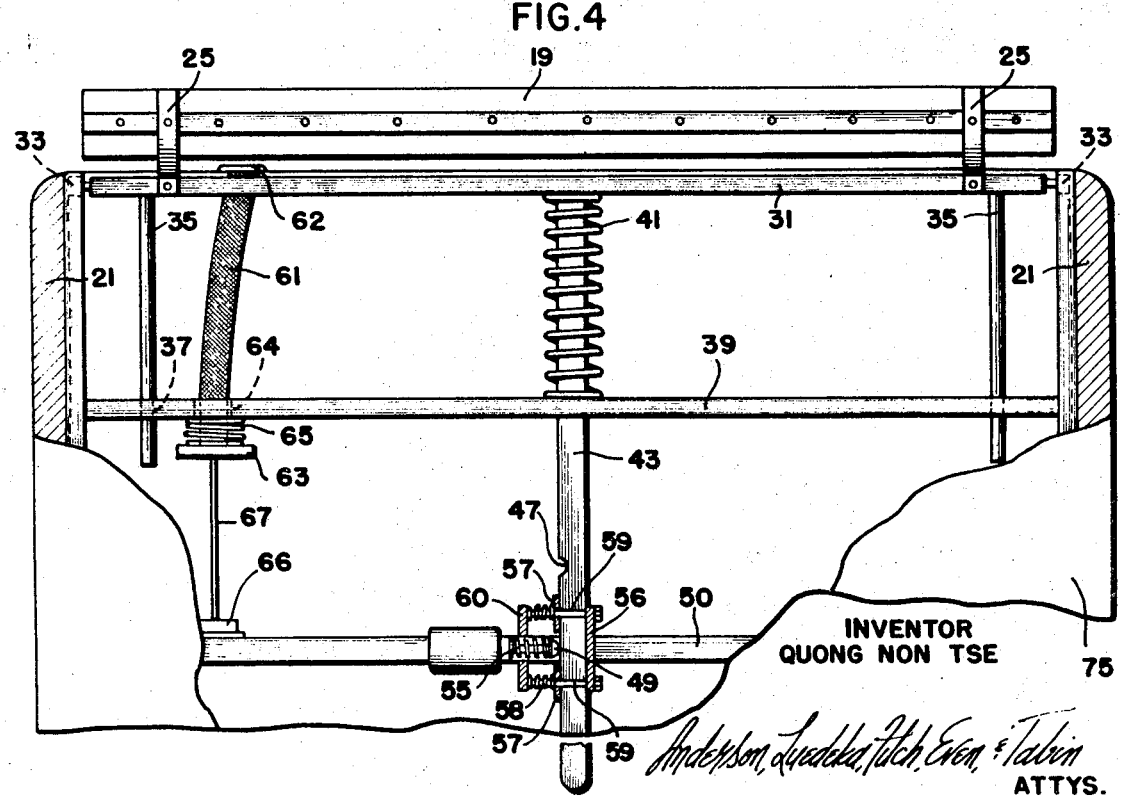
INVENTOR
QUONG NON TSE
ATTYS.

United States Patent Office

3,561,806
Patented Feb. 9, 1971

3,561,806
VEHICLE SAFETY SYSTEM
Quong Non Tse, 2315 S. Wentworth,
Chicago, Ill. 60616
Filed Sept. 19, 1968, Ser. No. 760,797
Int. Cl. B60r 21/02
U.S. Cl. 297—216       8 Claims

ABSTRACT OF THE DISCLOSURE

A head support for a vehicle passenger is automatically moved from an inoperative, retracted position to an operative head supporting position behind the passenger's head to reduce the possibility of injury due to "whiplash." Additionally, the passenger seat may be automatically shifted rearwardly away from the dashboard, windshield and steering wheel conjointly with shifting of the head support into the operative head supporting position.

---

This invention relates to improvements in safety for passengers of vehicles such as automobiles, trucks or the like.

A number of innovations are being employed to reduce the possibility of injury to seated passengers when the vehicle is struck from the rear, suddenly braked or impacted at the front. Even when wearing safety belts, the passengers involved in a front end collison are liable to be flung forwardly and pivoted about a seat belt and injured by contact with a dashboard, steering wheel or windshield. On the other hand, an impact from the rear causes the neck of a relaxed person to be suddenly extended and then to retract resulting in injuries to the neck or back commonly known as "whiplash." To alleviate effects of whiplash, vehicles are being equipped with head rests or supports, which are fastened to the top of the passenger seat and extend upwardly to a position immediately behind the passenger's head, to limit and cushion the movement of the passenger's head and neck relative to his torso and the vehicle. However, such head rests are not entirely satisfactory as the head rests are in position to block the view of the driver as he turns his head to look to the side and to the rear. Also, some drivers find head rests to be uncomfortable and esthetically undesirable.

Accordingly, a general obpect of the invention is to provide increased safety for drivers and passengers in vehicles and overcome the above described shortcomings of present vehicles.

Other objects and advantages of the invention will become more apparent from the following detailed description and drawings in which:

FIG. 1 is a diagrammatic illustration of a vehicle with a wall partially broken away to expose a passenger seat and the invention;

FIG. 2 is a schematic electrical diagram of the control circuit for causing operation of the safety system;

FIG. 3 is an enlarged rear view of a passenger seat partially broken away and illustrating a head support in its retracted position;

FIG. 4 is a view similar to FIG. 3, with the head support in its operative head supporting position, and, FIG. 5 is an enlarged fragmentary view of stop members and stop plates for the passenger seat.

As shown in the drawings for purposes of illustration, the invention is disclosed as applied to an automobile 11 (FIG. 1) which is modified to have a front passenger seat 13 slidably mounted on the automobile chassis for sliding movement to the rear away from the steering wheel 15 and dashboard 17, to the position illustrated in dotted lines in FIG. 1; and which has a modified passenger seat with a head support 19 which will automatically rise from an inoperative out-of-the-way position within the seat 13 to a head supporting position immediately behind the head of the passenger. As will be explained, control means are provided for the seat 13 and head rest 19 to cause the seat to shift and the head rest to move automatically to its operative head supporting position in response to an impact from the rear, or a high pressure application of the brakes of the vehicle, or alternatively to operation of any emergency braking lever switch.

Referring now to a detailed description of the preferred embodiment of the invention, the head support 19 is suitably cushioned with foam rubber or the like and extends across the entire width of the seat 13 to be effective to support the head of each person seated with his back against a back rest 21 of the seat 13. The head support 19 is generally in the shape of an elongated bar nested into a recess 23 formed in the top rear portion of the top of the back rest 21 and the head support is preferably formed to have its upper surface flush with and serve as a part of the top surface of the back rest 13.

To facilitate supporting the head of the passenger, the head support 19 is preferably mounted to rock toward the passenger's head as it moves upwardly to its operative head supporting position. In the present instance, this forward rocking movement is accomplished by curved spring steel bars 25 which are fastened at upper ends to the head support 19 and at lower ends to an operating means including a slidable carriage 27 (FIGS. 3 and 4). When the head support 19 is seated in the recess 23 the spring steel bars 25 are flexed in tension in a manner that when the head support 19 clears the recess 23, the spring steel bars 25 rock it forwardly toward the passenger's head. The spring steel bars 25 not only move the head support forward toward the passenger's head, but also provide a yieldable, retarding support for the head to alleviate effects of a hard impact from the rear.

The carriage 27 for carrying the head support upwardly from the recess 23 includes a frame slidably mounted in vertical guides or track means in the form of vertically disposed channels 29 (FIGS. 3 and 4) disposed at opposite sides of the back rest 21. The carriage is hidden from view by being within the back rest and includes a horizontal cross beam 31 which spans the guideway channels 29. The cross beam carries rollers 33 at its outer ends projecting into and rolling in the channels. To guide the carriage for easy and straight line travel, carriage 23 has vertically extending guide rods 35 which are fastened at upper ends to the cross beam 31 and project downwardly into and through guiding slots 37 formed in a fixed horizontal, stationary brace 39 of the frame of the back rest 21. The guide rods 35 extend sufficiently beneath the brace 39 to remain captured therein when the head support 19 is in the upper head supporting position.

The operating means for moving the head support 19 to its head supporting position also includes a power actuator in the form of a coiled compression spring 41 encircling a vertically extending post 43 fastened at its upper end substantially centrally of the cross beam 31 of the carriage. When the carriage is in its retracted, inoperative position (FIG. 3), the cross beam 31 compresses the spring against its lower end which rests on the top of the stationary brace 39. When the carriage is released for upward movement, the spring quickly expands and raises the carriage from the position illustrated in FIG. 3 to a position illustrated in FIG. 4. It is within the purview of the invention to provide other forms of power actuators to lift the head support such as hydraulic or pneumatic cylinder and piston or a motor and gear drive.

For the purpose of holding the head support 19 in retracted position in the back rest recess 23, a releasable holding means is provided which, in this instance, includes a detent means having detent notch 47 and a detent plunger 49 for entering into the notch 47. Preferably, the detent plunger 49 is mounted on a stationary brace 50 which is secured to the back rest frame and disposed generally horizontal and parallel to the brace 39. The detent notch 47 is in the post 43, although the positions of the detent plunger 49 and detent notch 47 could be reversed. The detent plunger 49 is a part of an electrically operated solenoid 53. A plunger return spring 55 encircles the plunger and biases the detent plunger against the post 43 and into the detent notch 47 when the solenoid coil is de-energized. Energization of the solenoid coil retracts the detent plunger from the detent notch 47 and compresses the plunger return spring 55.

The lower end of the post 43 is guided during its movement and is held against shifting laterally by the detent plunger 49 by a means including a vertically disposed plate 56 fastened on the brace 50 and abutting the right side of the post 43 and spring biased bars 57 engaging the left side of the post and urging the post against the plate 56. The bars 57 are engaged by the inner ends of compression springs 58 encircling each of four studs 59 which are spaced about the post 43 and fastened to the plate 56. Fastened to the outer ends of the four studs is a spring compression plate 60 which abuts the outer ends of the compression springs 58 and compresses the springs against the post engaging bars 57. Thus, the lower end of the post 43 is guided against wobbling and is held against shifting away from the detent plunger when engaged by it.

The movement of the head support 19 to its operative head supporting position should be automatic in response to an impact of predetermined force at the rear of the vehicle. To be most effective, a control means for the head support should operate automatically without initiation by the driver as he may be totally unaware of an impending impact. To these ends, the preferred control means is operable in response to a safety seat belt, preferably a shoulder strap 61 portion of the belt, becoming taut and stretching as the person's body begins to move relative to the vehicle at the time of impact. The shoulder strap runs through a suitable guide 62 (FIG. 4) which holds the strap against shifting laterally to bite into or rub against the driver's neck. The strap guide 62 is fixed to the top of the back rest adjacent the recess 23 for receiving the head support 19. The lower end of the shoulder strap is secured to a suitable anchor, which in this instance is a horizontally disposed anchor plate 63 disposed beneath the stationary brace 39. The shoulder strap 61 projects through an opening 64 in the stationary brace 39 to the anchor plate 63. As the anchor plate 63 is considerably larger in dimensions and in area than the dimensions and area of the strap opening 64, the anchor plate cannot pass through the opening 64 with an upward pull and displacement of the lower end of the strap. Interposed between the brace 39 and the anchor plate 63 is a coiled compression spring 65 which normally retards and limits the upward movement of the anchor plate until a very strong tug of a predetermined force is applied to the strap and anchor plate to compress the spring coils. The spring rate for the spring 65 is selected so that only a larger predetermined force, such as may cause a whiplash injury, assuming the seat belt is reasonably snug on the driver, may compress the spring 65 and displace the anchor plate 63 through a given distance sufficient to operate a microswitch 66 on the stationary brace 50. The anchor plate 63 is connected by means, such as a cable 67, to the microswitch to operate contacts 69 (FIG. 2) in the microswitch when the anchor plate 63 moves through a predetermined distance.

When the cable 67 operates the microswitch 66, its normally open contacts 69 (FIG. 2) close and complete an obvious circuit including a battery 70 for the solenoid 53 which then retracts the detent plunger 49 from the notch 47 and releases the carriage 27 to raise automatically the head support 19 to the head supporting position immediately behind the head of the passenger. Upon release of the tension from the seat belt 61, the contacts 69 will again open and de-energize the solenoid 53 so that the detent plunger 49 is returned and is ready to hold the carriage when it is returned to its lowered inoperative position.

At the time of an impact from the rear, the shifting of the passenger seat 13 rearwardly away from the steering wheel, dashboard and front windshield is not as important as the time of a front end impact or sharp application of the brakes when a person's momentum carries him toward the front of the vehicle, but it is preferred that the seat be so shifted. The actuating means for shifting the seat rearwardly from its forward position illustrated in solid lines in FIG. 1 to its rear position illustrated in dotted lines in FIG. 1 is in the form of a plurality of springs 71 (FIG. 1). Preferably, each of the springs 71 is disposed parallel to the illustrated spring and is a stretched contractile spring having a forward end 72 fastened to the seat 13 and a rearward end 73 to the chassis of the vehicle. The springs may be suitably disposed beneath the seat 13 so as not to be exposed to the passengers. It will be appreciated that it is within the purview of the invention that other forms of power actuators such as hydraulic or pneumatic cylinders be used in lieu of the springs 71.

Until released at an impact or an impending impact by a holding or stop means, the seat 13 is held against rearward movement. The holding means includes at least one stop member 75 (FIGS. 1 and 5), which is, in this instance, an extension of the carriage post 43, and includes a stop plate 77 (FIG. 1) secured to the floor of the vehicle. When the stop member 75 is in the downward solid line position (FIG. 5) and the seat 13 is in its forward position, the stop member abuts a downturned, forward flange 78 on the stop plate 77. The downturned flange 78 projects into a suitable aperture 79 in the floor of the vehicle and engages a rearward wall 80 defining the aperture 79. Preferably, the stop member 75 also projects into the aperture 79 when the post 43 is in a lower holding position. Thus, both the stop member flange 78 and the stop member are tightly abutting and firmly supported by the chassis when holding the seat against rearward movement by the spring force. The stop member 75 is covered by a rear panel 81 of the back rest, and the stop plate 77 is suitably covered by floor boards (not shown). If desired, the entire stop assembly may be disposed more forwardly than illustrated so as to be entirely beneath and covered by the seat during its entire movement which is preferably in the range of 12–14 inches.

With upward movement of head support carriage 27, the lower end of the stop member 75 will rise above the stop plate 77 and will no longer hold the seat 13 in its forward position with the result that the seat is shifted automatically to the rear by the springs 73. When returning the seat 13 to its forward position, it is preferred that the head support 19 and its carriage 27 be shoved downwardly to its detented position so that the stop member 75 is lowered. Then, as the seat 13 is shoved forwardly its lower end engages a top inclined surface 83 of the lock plate and flexes the same downwardly toward the floor of the vehicle, as shown in dotted lines in FIG. 5. When lock member 75 slides past the forward end of the lock plate 77, the latter returns upwardly to a position immediately behind the lock member 75. Thus, the seat 13 is locked in its forward position and the head support 19 is detented in its lower retracted position.

The passenger seat 13 is held in the forward position until released automatically by the seat belt becoming taut during impact, as above described, or by the driver who causes release in one of several ways. For instance, the release solenoid 53 may be conditioned for release by closing electrical contacts 85 (FIG. 2) in response to a high force applied by the driver to the brakes. The electrical contacts 85 are contained in a pressure switch (not shown) which monitors the fluid pressure in the hydraulic braking system and causes the contacts 85 to close when a predetermined pressure is obtained indicating an abnormally larger force being exerted by the driver on the foot pedal. To assure that the seat and head rest will not be released when the vehicle is travelling at a very low speed, even though the brakes are being applied with a force above that of the minimum level, another set of normally open, electrical contacts 87 may be connected in series with the limit switch contacts 85 for the brakes. The contacts 87 are operated in response to a predetermined movement of the speedometer needle and may be associated with a differential transformer, magnet or other sensing device for closing the contacts 87 when the needle is at or beyond the predetermined speed, e.g., 15 m.p.h. At speeds below this, the contacts 87 are open and the release solenoid 53 will not be operated with closure of the contacts 85. If desired, a simple time delay device or circuit (not shown) may be included in a series with the pressure switch contacts 85 and the contacts 87 so that the driver will not be prematurely shifted rearwardly, which might result in a loss of desired, last-instant, braking before or at initial impact.

One further manner of driver release of the seat and head support is by means of operation of the emergency braking lever (not shown), to which is connected normally open electrical switch contacts 89 disposed in parallel to the pressure switch contacts 85 and in series with the speedometer operated switch contacts 87. Thus, operation of the emergency brake lever and closing of switch contacts 89 while the vehicle is moving at speed sufficient to result in the contacts 85 also being closed, completes a path for energization of release solenoid 53. On the other hand, when the vehicle is at a standstill or only slightly moving, e.g., when parking, the speedometer-controlled contacts 87 are open and prevent operation of the release solenoid 53 by operation of either the emergency braking lever or the foot brake pedal.

In the illustrated embodiment of the invention, the head support 19 is shown as a single, long piece extending across the length of the back rest for positioning behind the head of each passenger in the front seat. It will be appreciated that the head suport 19 could be formed with two separated portions received in two laterally spaced recesses 23 and connected to the same carriage 27 for movement between the retracted and head supporting positions. Alternatively, duplicate carriages 27 and head rests could be used, one for the driver's position and one for the passenger's position. That is, the illustrated apparatus may be made sufficiently smaller that two separate apparatuses would be positioned side by side in back rest for movement to support the head of the driver and the passenger when the solenoids 53 of the respective apparatus are operated simultaneously by a common control circuit like that illustrated in FIG. 2.

From the foregoing, it will be seen that the safety system provides a head support which is automatically shifted into operative position at the time of a hard impact to the rear of the vericle. Also, the passenger seat is automatically shifted rearwardly and away from the steering wheel and windshield upon operation of a brake pedal with unusually high force application to the foot brake pedal, provided that the vehicle is traveling faster than a predetermined speed.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a safety system for a vehicle, the combination comprising, a passenger seat in said vehicle, a head support for limiting the amount of extension of a passenger's neck during a rear end collision, means mounting said head support in said vehicle for movement from a lower inoperative position relative to said passenger seat and the head of a passenger seated thereon to an upper head supporting position above said passenger seat and immediately behind the head of a person seated on the passenger seat, operating means for moving said head support from its inoperative, lowered position to its operative head supporting position, a safety belt in said vehicle for restraining the passenger while seated in said passenger seat, and control means operably connected to and operable in response to a predetermined amount of force on said safety belt to cause said operating means to move said head support to said head supporting position.

2. A combination in accordance with claim 1 in which the operating means includes a spring means for biasing the head support to its upper head supporting position.

3. A combination in accordance with claim 2 in which said head support is carried on a vertically slideable carriage which is biased by said spring means to slide upwardly to carry the head support into its upper head supporting position and in which a releasable holding means is provided for holding said carriage and thereby said head support in its lowered inoperative position until released.

4. The combination of claim 1 in which said control means includes a first switch operable in response to a predetermined amount of force in a hydraulic braking system and a second switch operable in response to movement of the vehicle at or above a predetermined speed so that a combination of braking pressure and vehicle speed are parameters controlling operation of release of said head support.

5. The combination in accordance with claim 1 in which a steering wheel and a dashboard are provided in said vehicle and in which means are provided for shifting said seat rearwardly away from the steering wheel and dashboard of the vehicle and in which said control means selectively controls said means for shifting said seat rearwardly.

6. The combination of claim 5 in which said means for shifting said seat rearwardly includes springs biasing said seat to move rearwardly away from the steering wheel and dashboard of the vehicle.

7. The combination of claim 6 in which a vertically movable carriage moves said head support to its head supporting position and which means associated with said carriage releases said seat for rearward movement by said springs.

8. A safety system for use in a vehicle comprising a passenger seat, means for shifting said passenger seat rearwardly, means operable in response to an impact of predetermined force on said vehicle to operate said means for shifting said seat rearwardly, said means operable in response to said predetermined force including a safety belt, and further including control means operably connected to said safety belt and operable in response to predetermined force thereon to operate said means for shifting said seat rearwardly.

References Cited
UNITED STATES PATENTS

| | | | |
|---|---|---|---|
| 2,335,340 | 11/1943 | Koppelman | 280—29 |
| 2,900,036 | 8/1959 | Blake | 296—65.1 |
| 2,974,998 | 3/1961 | Himka | 296—65 |
| 3,336,045 | 8/1967 | Kobori | 280—150 |
| 3,397,911 | 8/1968 | Brosius | 297—216 |

FOREIGN PATENTS

| | | | |
|---|---|---|---|
| 1,122,195 | 4/1955 | France | 296—65.1 |

LEO FRIAGLIA, Primary Examiner

R. R. SONG, Assistant Examiner

U.S. Cl. X.R.

280—150; 296—65; 297—385